W. A. KIRBY.
Harvester Cutter.
No. 14,694.
Patented April 15, 1856.
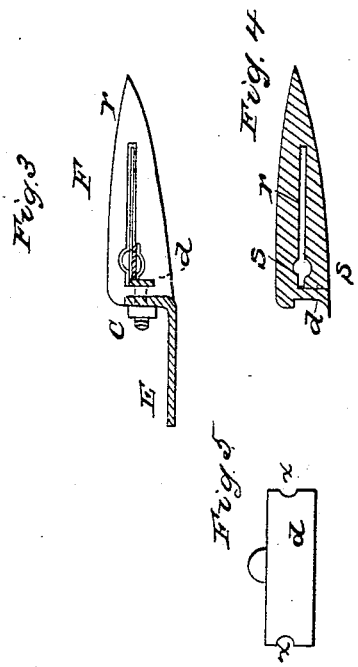
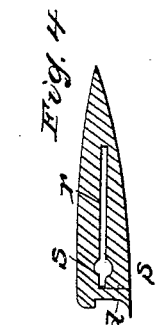
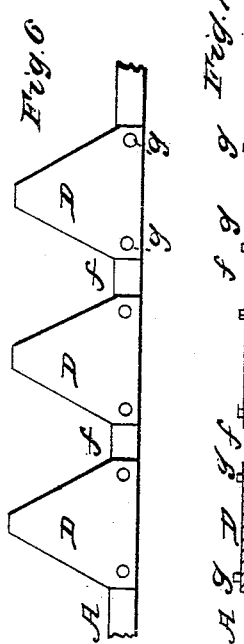
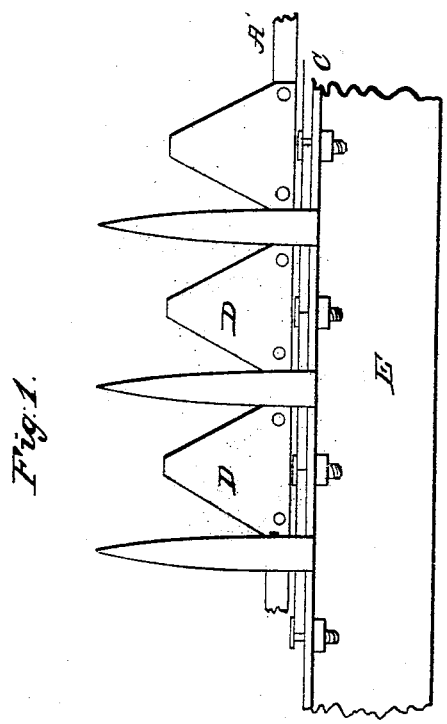
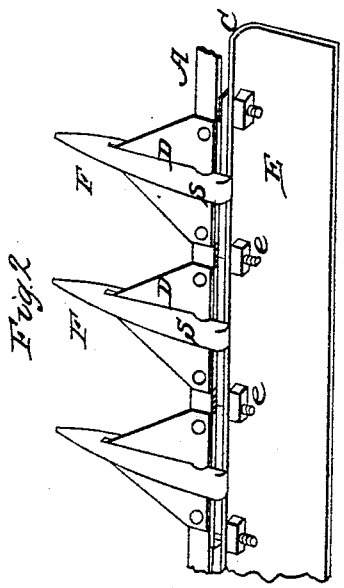

UNITED STATES PATENT OFFICE.

WILLIAM A. KIRBY, OF BUFFALO, NEW YORK.

IMPROVEMENT IN GRAIN AND GRASS HARVESTERS.

Specification forming part of Letters Patent No. 14,694, dated April 15, 1856.

*To all whom it may concern:*

Be it known that I, WM. A. KIRBY, of Buffalo, in the county of Erie and State of New York, have invented certain new and useful Improvements in Grain and Grass Harvesters; and I do hereby declare that the following is a full, clear, and exact description of the same, reference being had to the accompanying drawings, making a part of this specification, of which—

Figure 1 is a top view of the finger-bar, with cutters, &c., in place; Fig. 2, a perspective view of the same, exhibiting the inter-space of the cutters on the cutter-bar; Fig. 3, an end view of bar, fingers, &c.; Fig. 4, a longitudinal section of the improved finger; Fig. 5, a view from the back of finger; Fig. 6, a top view of cutters and bar; Fig. 7, a section of cutters and bar, with projecting heads of rivets.

The nature of my improvements in the cutting apparatus of grain and grass harvesting machines consists, in the first place, in the manner of attaching the fingers to the finger-bar; and, secondly, it consists in an improved mode of constructing the finger with a recess upon the upper as well as on the lower side of the slot, through which projecting heads of a rivet uniting the cutter and bar shall enter. This I claim as novel when used with an interspace between the cutter-blades on the bar, peculiar to the manner hereinafter described, as I am aware that a projecting rivet-head and grooved slot on the lower side have been used, but not with the advantages of my improvement, as I am enabled to use a finger in which the slot shall wholly embrace the cutter and yet possess the requisite clearing properties in an eminent degree.

To enable others skilled in the manufacture to construct my improved cutting apparatus, I would describe it as follows:

E represents the finger-bar, which may be attached to the frame of the harvester in any suitable manner. It is constructed of metal, and by having its front edge turned upward it forms a ledge, c, at right angles to the principal portion or flat of the bar. (See Fig. 3.) Instead of being perfectly square at the bend or angle it is slightly curved for the better prevention of grass entering the joint, and for the more perfectly securing the fingers on the ledge.

F F are the fingers, formed with a longitudinal slot, r. Near the rear end of slot recesses s s are formed, (see Fig. 4,) one being above and the other below the slot. To the back end of each finger a bar, d, is attached, at right angles to the body of finger, and at the ends of those bars semicircular recesses x x are formed for the passage of the attaching-bolts e e. The heads of those bolts when projecting on the front side of the bar d, serve the purposes of guides to the cutter-bar; but flush head-bolts may be used.

A is the cutter-bar, upon which are secured the cutters D D D. Each cutter is so placed on the bar as to leave an interspace, f f, between them, and they are secured by two rivets, g g, whose heads or ends project both above the face or surface of the cutter and below the under side of the bar A. It is by means of said projections entering the recesses s s of the finger, in combination with the space between the cutters, that soft grass is effectually removed and choking prevented. This would not be so completely effected if it were not for the dropping of said grass between the shoulders formed by each cutter as separated on the bar. (See Fig. 7.)

The advantages I have gained by the mode of constructing my finger-bar enables me to use light metal bars strengthened by the projecting ledge or flange by this means, also, being enabled to clear more effectually the cut grass from the finger-bar, as the stubble takes hold thereof and thus withdraws it; and by my mode of clearing the cutters and bar by the rivet-heads and interspace of the cutters on the bar I am enabled to construct the fingers by casting in a cheap, strong, and simple manner.

I am aware that an angle-iron as a bar for the support of the fingers is not new; but

What I claim as my invention, and desire to secure by Letters Patent, is—

1. The manner of attaching the fingers as constructed with semicircular recesses x x, whereby they are secured to the angle-iron finger-bar by bolts, without reducing the strength of bar *d* of the finger, while the bolts themselves serving the double purpose of securing the finger and as guides to the cutter-bar, substantially as set forth.

2. The use of the rivets *g g*, when projecting above and below the cutters, and used with the interspace *f* and recesses *s s* of the fingers, as set forth.

In testimony whereof I herewith sign my name before two subscribing witnesses.

WM. A. KIRBY.

Witnesses:
   JOHN F. CLARK,
   JOHN S. HOLLINGSHEAD.